Jan. 12, 1960            A. SERNA            2,920,391
SINGLE ADJUSTMENT VARIABLE RATIO PANTOGRAPH
Filed Aug. 4, 1958            3 Sheets-Sheet 1
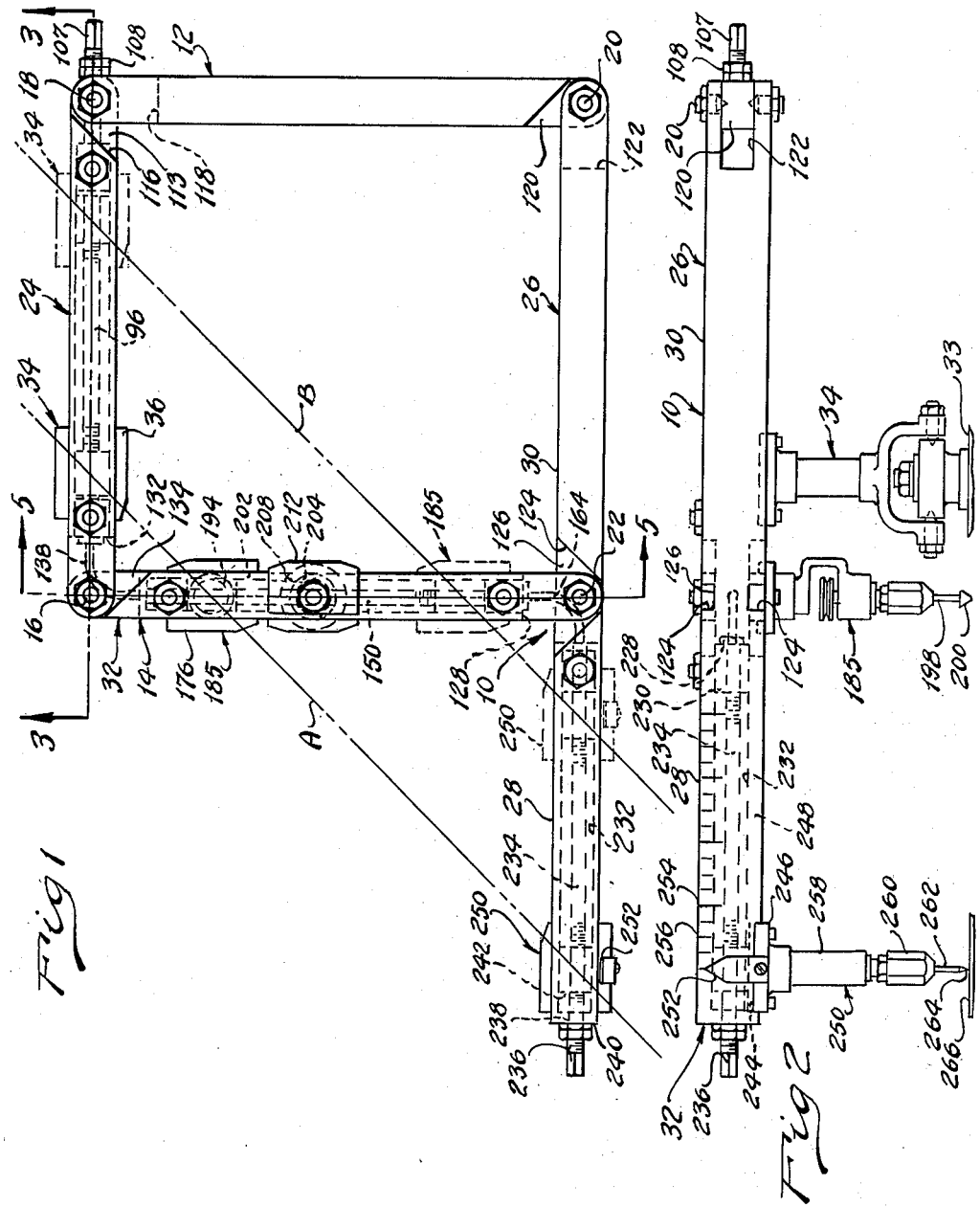
INVENTOR.
ALEX SERNA
BY Barthel & Bugbee
ATTY'S.

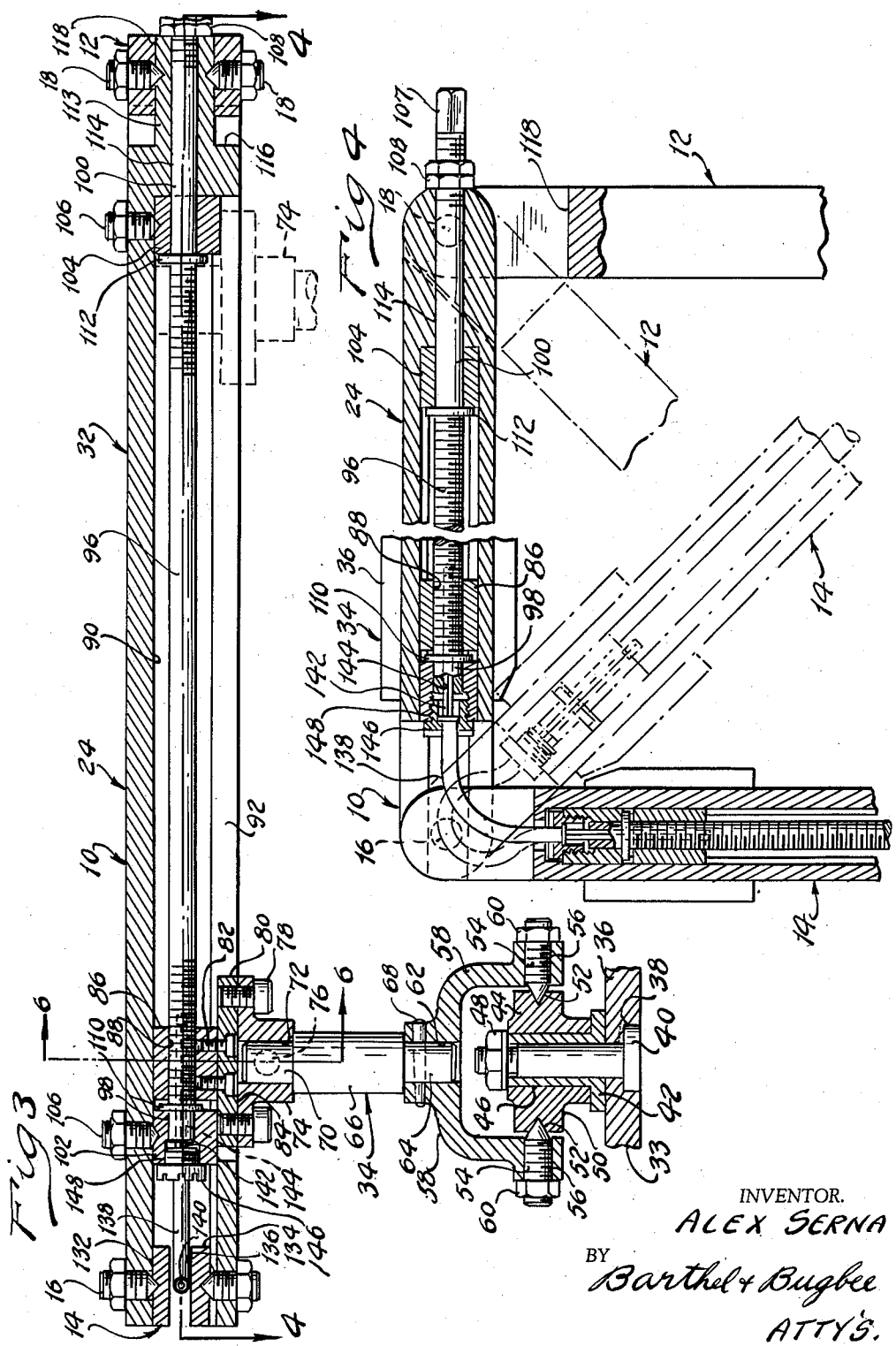

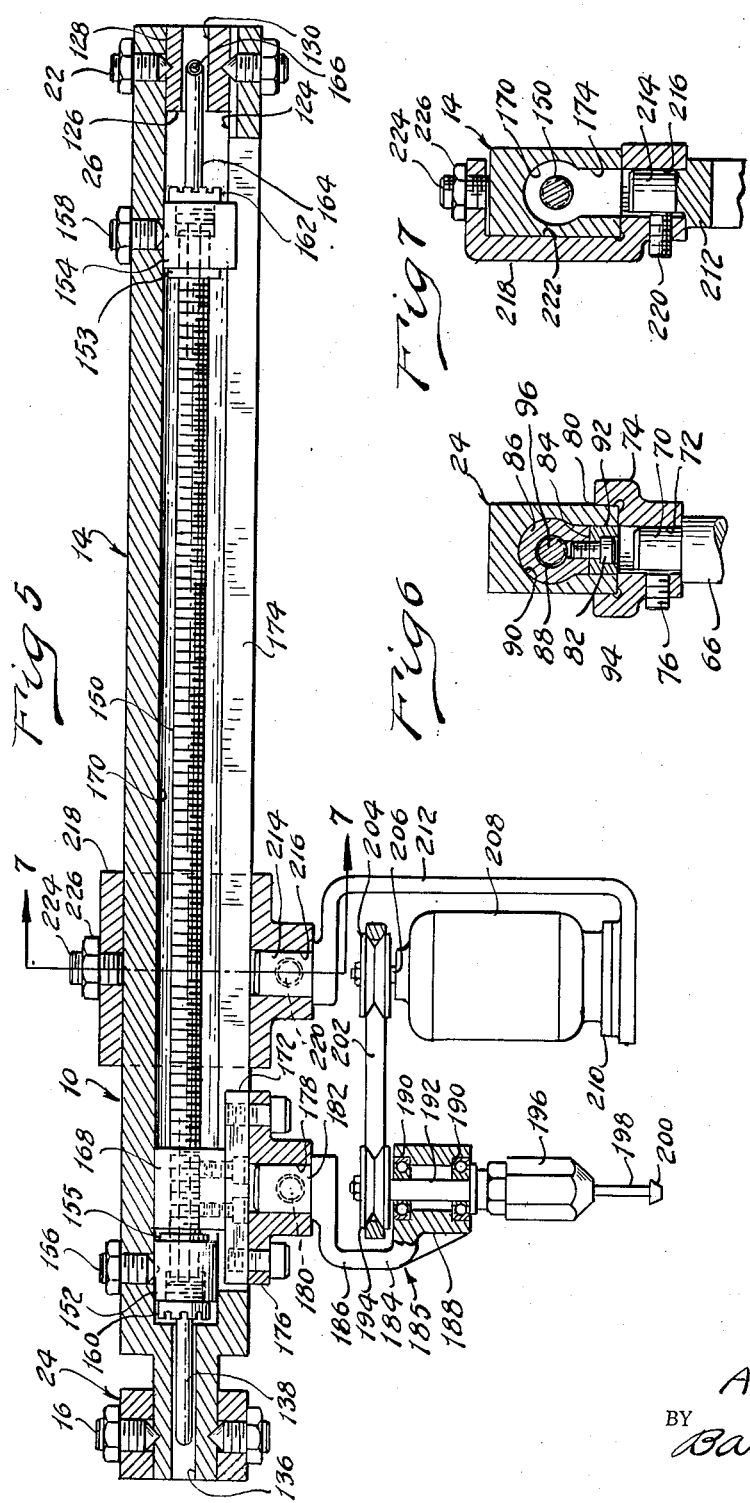

United States Patent Office 2,920,391
Patented Jan. 12, 1960

2,920,391
SINGLE ADJUSTMENT VARIABLE RATIO PANTOGRAPH

Alex Serna, Dearborn, Mich.

Application August 4, 1958, Serial No. 752,941

10 Claims. (Cl. 33—25)

This invention relates to pantographs and, in particular, to adjustable pantographs wherein the size ratio between the object or pattern traced and the design reproduced can be varied.

One object of this invention is to provide a variable ratio pantograph wherein the size ratio between the design traced and the design reproduced can be adjusted for variation by means of a single adjustment mechanism.

Another object is to provide a variable ratio pantograph of the foregoing character wherein all moving parts of the pantograph are mounted thereon and supported on an improved mount which permits exceptional freedom of action and mobility.

Another object is to provide a variable ratio pantograph of the foregoing character wherein ratio adjustment mechanism is provided for simultaneously adjusting three vital points in the pantograph relatively to one another to maintain alignment regardless of the change of ratio or proportion which is brought about by varying this adjustment.

Other objects and advantages of the invention will become apparent during the course of the following description of the accompanying drawings, wherein:

Figure 1 is a top plan view of an improved pantograph, according to one form of the invention;

Figure 2 is a front elevation of the pantograph shown in Figure 1;

Figure 3 is an enlarged longitudinal section taken along the line 3—3 in Figure 1;

Figure 4 is a horizontal section, partly broken away, taken along the line 4—4 in Figure 3;

Figure 5 is a longitudinal section taken along the line 5—5 in Figure 1 in a plane at right angles to the section plane of Figure 3;

Figure 6 is a cross-section taken along the line 6—6 in Figure 3; and

Figure 7 is a cross-section taken along the line 7—7 in Figure 5.

Referring to the drawings in detail, Figures 1 to 5 inclusive show a pantograph, generally designated 10, according to one form of the invention as composed of parallel links, generally designated 12 and 14 pivotally connected at 16, 18, 20 and 22 respectively by pivot elements so designated, to parallel links, generally designated 24 and 26, the link 26 being longer than the links 12, 14 and 24 by having an extension 28 projecting beyond its main portion 30 on the opposite side thereof from its pivot 22 with the link 14.

The pantograph operating assembly, generally designated 32 and including the links 12, 14, 24 and 26 and their associated mechanisms is supported upon a bed, table or other horizontal supporting means 33 (Figures 2 and 3) by an upstanding supporting structure or unit, generally designated 34, engaging the link 24 (Figure 3). The supporting structure 34 consists of a base plate or other base 36 centrally bored and counterbored as at 38 to receive an upstanding headed pivot stud 40. The latter carries a flanged sleeve 42 which in turn carries a twin-armed support 44 bored at 46 to receive the sleeve 42. This assembly is held in place by a retaining nut 48 threaded upon the threaded upper end of the pivot stud 40.

The twin-armed support 44 (Figure 3) as its name signifies, has oppositely-extending arms 50 which are provided with aligned conical center sockets 52 which are aligned with the axis of the pivot stud 40. Engaging the center sockets 52 are oppositely-directed conical-tipped center screws 54 threaded through aligned threaded bores 56 in the ends of an inverted approximately U-shaped bracket 58 and locked in position by lock nuts 60 threaded upon the pivot screws 54. The bracket 58 is centrally bored as at 62 to receive the reduced diameter lower end portion 64 of a vertical supporting shaft 66 held in place by a drive pin 68. The reduced diameter upper end portion 70 of the supporting shaft 66 is secured within a bore 72 of a bracket 74 (Figures 3 and 6) by a set screw 76. The bracket 74 in turn is secured by screws 78 to a slide block 80 which in turn is secured by screws 82 to the flattened under side 84 of an otherwise cylindrical slide nut 86. The slide nut 86 is bored and threaded as at 88 and is mounted for reciprocation in a cylindrical bore 90 in the link 24, the link 24 having an elongated slot 92 extending from the bore 90 to the exterior of the link 24 and slidably receiving the slide block 80 (Figure 6). The bracket 74 has a recess 94 in the form of a parallel-walled groove into which fits the lower portion of the link 24.

Threadedly engaging the threaded bore 88 of the slide nut 86 is a first screwshaft 96 (Figure 3) with a right-hand thread. The smooth opposite ends 98 and 100 of the screwshaft 96 are journaled in centrally-bored cylindrical bearing blocks or sleeves 102 and 104 respectively mounted near the opposite ends of the bore 90 and held in position by set screws 106. The end portion 100 is squared as at 107 (Figures 1 and 4) to receive an adjusting wrench (not shown) and also is threaded to receive jam nuts or lock nuts 108 (Figure 3) which are loosened during adjustment and tightened to maintain the adjustment, particularly while the pantograph is being operated. Collars or enlargements 110 and 112 adjacent the bearings blocks or sleeves 102 and 104 hold the screw shaft 96 against end motion and thus serve as thrust bearings.

The reduced-thickness end portion 113 of the link 24 adjacent the bearing block 104 is bored at 114 for the passage of the smooth portion 100 of the screwshaft 96 and is also provided with rabbets 116 in its upper and lower surfaces for receiving the notched out end portion 118 of the link 12. As previously stated, a pivot connection therebetween is made by the pivot screws 18 having conical ends pivotally engaging the end portion 113 of the link 24. In a similar manner, the opposite end of the link 12 is reduced in thickness as at 120 (Figures 1 and 2) for receiving the notched-out portion 122 to which it is pivotally connected by the pivot screws 20 previously mentioned and forming a pivot connection similar to that formed by the pivot screws 18. The intermediate portion of the link 26 between its main portion 30 and its extension 28 is also recessed at 124 to provide a reduced thickness portion 126 (Figures 1 and 2) for engagement by the notched-out forward end portion 128 of the link 14 (Figure 5), and a pivotal connection therebetween is made, as stated before, by the pivot screws 22 in a similar manner to that described above for the pivot screws 18 and 20. The reduced thickness intermediate portion 126 of the forward link 26 is provided with a passageway or recess 130 for reception of a flexible cable mechanism subsequently to be described.

Returning to the construction of the rearward link 24, the left-hand end thereof is notched out as at 132 (Figure 3) to receive the reduced thickness rearward end portion 134 of the link 14 to which it is pivotally connected by the pivot screws 16 in the manner previously described in connection with the pivot screws 18, 20 and 22. The link end portion 134 is bored out as at 136 (Figure 3) for the passage of a flexible motion-transmitting cable 138 containing a flexible motion-transmitting member 140 and terminating in a squared end portion 142 fitting into a correspondingly-squared socket 144 in the left-hand end portion 98 of the screw shaft 96. As a consequence, rotation imparted to the member 140 of the flexible cable 138 correspondingly rotates the screw shaft 96 so as to move the slide nut 86 to and fro relatively to the bore 90, so as to shift the link 24 relatively to the upright supporting structure 34 between the extreme positions shown in the the solid line position near the left-hand end of Figure 3 and the dotted line position near the right-hand end thereof. A tubular nut 146 (Figures 3 and 4) encircling the flexible cable 138 and threaded into a threaded counterbore 148 in the bearing block 102 anchors the flexible cable 138 thereto, while permitting relative rotation of its internal motion-transmitting member 140.

The link 14 (Figures 4 and 5) is bored and slotted in a similar manner to that described above in connection with the link 24 and similarly is provided with a second screwshaft 150 closely resembling the screw shaft 96 and similarly rotatably mounted therein. In particular, the second screwshaft 150 is rotatably mounted in tubular bearing blocks 152 and 154 and prevented from moving endwise by thrust collars 153 and 155. The blocks 152 and 154 are held in place by set screws 156 and 158 and bored and threaded to receive tubular nuts 160 and 162 (Figure 5) for anchoring therein the adjacent ends of the flexible motion-transmitting shaft 138 previously described and a second motion-transmitting shaft 164 having an internal rotary motion-transmitting element 166. The ends of the motion-transmitting elements 140 of the flexible shaft 138 and 166 of the flexible shaft 164 are squared, as before, to enter correspondingly-squared sockets in the opposite ends of the screwshaft 150, as described above in connection with the construction of the link 24.

The screwshaft 150 threadedly engages a generally cylindrical flat-bottomed slide nut 168 slidable to and fro within a longitudinal cylindrical bore 170 and having bolted to it a slide block 172 similar to the slide block 80 and similarly slidable to and fro in a slot 174 (Figure 7) in the bottom of the link 14 communicating with the cylindrical bore 170. Similarly bolted to the slide block 172 is a bracket 176 having therein a vertical bore 178 in which is secured, as by the set screw 180, the shank 182 of an approximately U-shaped shaft hanger 184 (Figure 5) forming a part of a reciprocable cutting unit, generally designated 185. The shaft hanger 184 has an approximately U-shaped central portion 186 and a lower bearing boss 188 bored to receive spaced antifriction bearing units 190 in which is rotatably mounted a cutter shaft 192. Keyed or otherwise drivingly connected to the upper end of the cutter shaft 192 is a belt pulley 194, whereas mounted on the lower end of the cutter shaft 192 is a chuck 196 containing a rotary cutting tool 198 having a cutting tip or design reproducer 200 on the lower end thereof. The chuck 196 is rotatable relatively to the shaft 192 to loosen its grip upon the cutting tool 198 so as to permit the replacement of the latter with other types or sizes of cutting tools in a manner well-known to mechanical engineers conversant with such chucks.

Drivingly engaging the pulley 194 is an endless belt 202 (Figure 5) which drivingly engages a corresponding pulley 204 keyed or otherwise drivingly connected to the armature shaft 206 of a vertical electric motor 208. The latter has a base 210 mounted upon and secured to a U-shaped motor mounting bracket 212, terminating at its upper end in a shank 214. The latter is secured in a bore 216 in a bracket 218 by means of a set screw 220 threaded therethrough (Figures 5 and 7). The bracket 218 is notched out or channeled as at 222 (Figure 7) to receive and snugly but slidably engage the link 14, which like the links 12, 24 and 26 is of rectangular cross-section. The bracket 218 is locked in any desired position of adjustment by a set screw 224 threaded through the upper portion thereof and locked in position by a lock nut 226.

Returning to the forward end of the link 14 at its pivotal connection 22 with the link 26 (Figures 1, 2 and 5), the remaining end of the flexible shaft 164 after passing through the passageway 130 is similarly anchored by a tubular nut 228 to a bearing block 230 in a manner similar to its opposite end by the tubular nut 162 in the bearing block 154. The bearing block 230 is secured in position within a bore 232 in the extension 28 of the link 26 similar to the bores 170 and 90 in the links 14 and 24 respectively and similarly rotatably containing and supporting a third screwshaft 234 similar to the first and second screwshafts 96 and 150 and similarly held against end motion. The outer or left-hand end of the third screwshaft 234 is squared as at 236 in a manner similar to the squared portion 107 of the first screwshaft 96 and for the same purpose of receiving an adjusting wrench (not shown). The left-hand end of the third screwshaft 234 is rotatably mounted in a reduced diameter bore 238 (Figure 1) communicating with the larger diameter bore 232 and formed in the left-hand end wall 240 of the link extension 28.

Reciprocably mounted within the bore 232 is a generally cylindrical flat-bottomed slide nut 242 similar to the slide nuts 86 and 168 previously described and having bolted thereto a slide block 244 (Figure 2) similar to the slide blocks 80 and 172 and in turn similarly having a bracket 246 bolted thereto, like the brackets 74 and 176 mentioned above. The slide block 244 reciprocates to and fro in a bottom slot 248 similar to the bottom slots 92 and 174 and similarly communicating with its bore 232 like their respective longitudinal bores 90 and 170. The bracket 246 (Figure 2) forms the upper part of a reciprocable tracing unit, generally designated 250, and carries an upstanding pointer 252 registering with a divided scale 254 having graduations 256 suitably marked to indicate the various ratios or proportions within the range of adjustment of the pantograph 10. The bracket 246 on its lower side is bored to receive the upper end of a non-rotary shaft 258, the lower end of which is threaded to receive a chuck 260 in which is mounted a tracing stylus or design or pattern tracer 262 having a tracing point 264 adapted to engage a pattern 266 upon which the design or other matter to be traced and enlarged or reduced is inscribed or indented, as the case may be.

For proper operation of the pantograph 10, it is desirable that in its various positions of adjustment its mechanism will position the axes of the supporting unit 34, the cutting unit 185 and the tracing unit 250 in alignment with one another, as indicated by the parallel inclined chain lines A and B in Figure 1. These lines A and B represent the extreme limits of adjustment in either direction. In order to bring about this condition, the first and third screwshafts 96 and 234 must have threads of an opposite hand from that of the second screwshaft 150. For purposes of example, it will be assumed that the first and third screwshafts 96 and 234 have right-hand threads and the second screwshaft 150 a left-hand thread in order to bring about the constant condition of alignment mentioned above and further described below in connection with the operation of the invention. The opposite arrangement of threads could equally well be adopted, namely left-hand threads for the first and third screwshafts 96 and 234 and a right-hand thread for the screwshaft 150.

In the operation of the invention, to adjust the ratio or proportion of the design produced by the cutter 200 from a given size of pattern 266 traced out by the point 264 of the tracing stylus 262, the operator applies a suitable wrench to either the squared portion 107 at one end of the first screwshaft 96 or to the squared portion 236 on the end of the third screwshaft 234, whichever is the more convenient. He then rotates the thus-selected screwshaft in a suitable direction to move the pantograph operating assembly 32 bodily relatively to the supporting unit 34 and at the same time to move the cutting unit 185 and tracing unit 250 along their respective links 14 and 26 in opposite directions to one another so as to maintain the above-mentioned alignment indicated by the parallel chain lines A and B in Figure 1.

Assuming for purposes of illustration that the parts are in their solid line positions shown in Figure 1 and that it is desired to move them to their dotted line positions shown in the same figure, and also assuming right-hand threads on the first and third screwshafts 96 and 234 and a left-hand thread on the second screwshaft 150, clockwise rotation of the third screwshaft 234 by a wrench applied to the squared portion 236 moves the tracing unit 250 to the right along the extension 28 of the link 26 toward the dotted line position thereof (Figure 1). The clockwise rotation of the third screwshaft 234 is transmitted by the flexible shaft 164 to the second screwshaft 150 which, because of its left-hand thread, causes the cutter unit 185 to move from its solid line position toward its dotted line position and consequently toward the link 26. The clockwise rotation of the second screwshaft 150 is transmitted to the first screwshaft 96 through the flexible shaft 138. This action moves the entire pantograph operating assembly 32 bodily relatively to the supporting unit 34, secured to the table 33. The relative effect, however, is more easily shown and understood by indicating the operating unit 34 as moved to the right (Figures 1 and 3). The maximum range of adjustment is indicated by the dotted line positions in Figure 1. Since the motor mounting bracket 212 is open-sided (Figure 7) it can be removed from the link 14 by loosening the nut 226 and set screw 224, or pushed along the link 14 in order to prevent it from interfering with the travel of the bracket 176 and cutting unit 185 along the link 14. If enough space does not remain in front of the unit 185 when so adjusted, the motor 208 and its bracket 212 are removed bodily from the link 14 in front of the cutting unit 185 and replaced behind it on the link 14. The belt 202 is then tightened before the set screw 224 and lock nut 226 are again screwed down to clamp the motor bracket 212 again in position, ready for renewed operation.

Reverse rotation of the screwshafts moves these units in the reverse direction, reversely altering the proportionate enlargement or reduction of the pattern or design 266, as indicated by the position of the pointer 252 (Figure 2) on one of the graduations 256 of the graduated scale 254. Thus, from a single location, namely the squared shaft portion 236 or 108, the entire instrument can be adjusted to vary its ratio of enlargement or reduction, thereby saving time and rendering the instrument much more simple to adjust than prior pantographs.

It will be understood that in place of the supporting unit 34 there may be provided a stationary upright column mounted on a suitable base on the supporting table and having a horizontal arm projecting from it. By means of racks and pinions mounted on the pantograph, the back and forth motions and the transverse motions of the pantograph may be transmitted by flexible shafts to a compound rest mounted on the underside of a turntable which in turn is mounted on the underside of the horizontal arm of the stationary upright column. By this means, the slides of the compound rest can be rotated to any angle in relation to each other, the lower slide carrying the rotating cutter or scriber. The turntable in this modification is operated by a flexible shaft from the pantograph to a pinion and gear on the turntable, and the slides of the compound rest by rack and gears and by flexible shafts from the pantograph. The vertical motion of the pantograph in this modification is transmitted to the compound rest by rack and pinion and flexible shaft mechanism for direct or inverted motion of the pantograph so as to convert the form being traced by the pantograph from concave to convex and vice versa.

By means of racks and pinions mounted on the pantograph, the motions or movements thereof can be transmitted to the slide rest of the cutter or other reproducer, thereby performing functions similar to those performed by an oscillograph, or make perspective drawings as a drafting instrument, and also to perform some mathematical functions, such as, for example, to convert one form of graph or curve into another.

It will also be understood that universal joints or gears with curved teeth can be used instead of flexible shafts to interconnect the various screw shafts while permitting relative motion of the parallelogram linkage. It will also be understood that the driving motor 208 may be mounted directly on the slide bracket 176 and the chuck 196 mounted directly upon its armature shaft 206 for direct drive of the cutting tool 198.

What I claim is:

1. A variable-reproduction-ratio pantograph comprising a pantograph-operating linkage assembly including four link members pivotally interconnected in parallelogram formation, three of said link members having longitudinal slideways therealong, a slide mounted on each slideway for relative longitudinal travel therebetween, a design tracer mounted on one of said slides and adapted to follow a design to be reproduced, a design reproducer mounted on another of said slides and having thereon a design-reproducing element adapted to reproduce the design being traced by the design tracer, a linkage assembly support connected to the third of said slides in sustaining relationship therewith, a rotary reproduction-ratio adjuster rotatably mounted on said assembly, and mechanism responsive to the rotation of said adjuster for moving said linkage assembly bodily relatively to said linkage assembly support and at the same time moving the tracer slide and the reproducer slide relatively to their respective link members while maintaining the axes of said tracer, reproducer and support in alignment with one another.

2. A variable-reproduction-ratio pantograph, according to claim 1, wherein one of said link members has a prolongation thereon extending away from said parallelogram formation and carrying one of said slideways and one of slides.

3. A variable-reproduction-ratio pantograph, according to claim 2, wherein the prolongation has one of said slideways thereon and carries one of said slides.

4. A variable-reproduction-ratio pantograph, according to claim 3, wherein the prolongation slideway carries the tracer slide.

5. A variable-reproduction-ratio pantograph, according to claim 1, wherein said mechanism includes a screwshaft rotatably mounted on each of said three links, a traveling nut threaded upon each screwshaft and connected to each slide, and rotary motion-transmitters operatively interconnecting said screwshafts, one of said screwshafts being connected to said adjuster.

6. A variable-reproduction-ratio pantograph, according to claim 5, wherein one of said screwshafts has a thread thereon of opposite hand to the threads of the other two screwshafts.

7. A variable-reproduction-ratio pantograph, according to claim 5, wherein said motion transmitters include flexible shafts.

8. A variable-reproduction-ratio pantograph, according to claim 2, wherein said mechanism includes a screwshaft rotatably mounted on each of said three links, one screwshaft being mounted on the prolongation of one of said three links, a traveling nut threaded upon each screwshaft and connected to each slide, and rotary motion transmitters operatively interconnecting said screwshafts, one of said screwshafts being connected to said adjuster.

9. A variable-reproduction-ratio pantograph, according to claim 1, wherein said reproducer includes a rotary motor and a rotary cutting tool operatively connected to said motor.

10. A variable-reproduction-ratio pantograph, according to claim 1, wherein said support has a base portion and an upstanding portion tiltably mounted on said base portion and connected to its respective slide.

References Cited in the file of this patent

UNITED STATES PATENTS

| | | |
|---|---|---|
| 1,235,668 | Eaton | Aug. 7, 1917 |
| 2,551,953 | Larson | May 8, 1951 |
| 2,726,615 | Downing | Nov. 16, 1951 |
| 2,766,529 | Dwyer | Oct. 16, 1956 |